3,026,555
WINDSCREEN WIPERS
Walter Dudley, Quadro Works, Arrow Road Factory
Centre, Redditch, England
Filed May 25, 1960, Ser. No. 31,742
Claims priority, application Great Britain May 23, 1959
5 Claims. (Cl. 15—250.20)

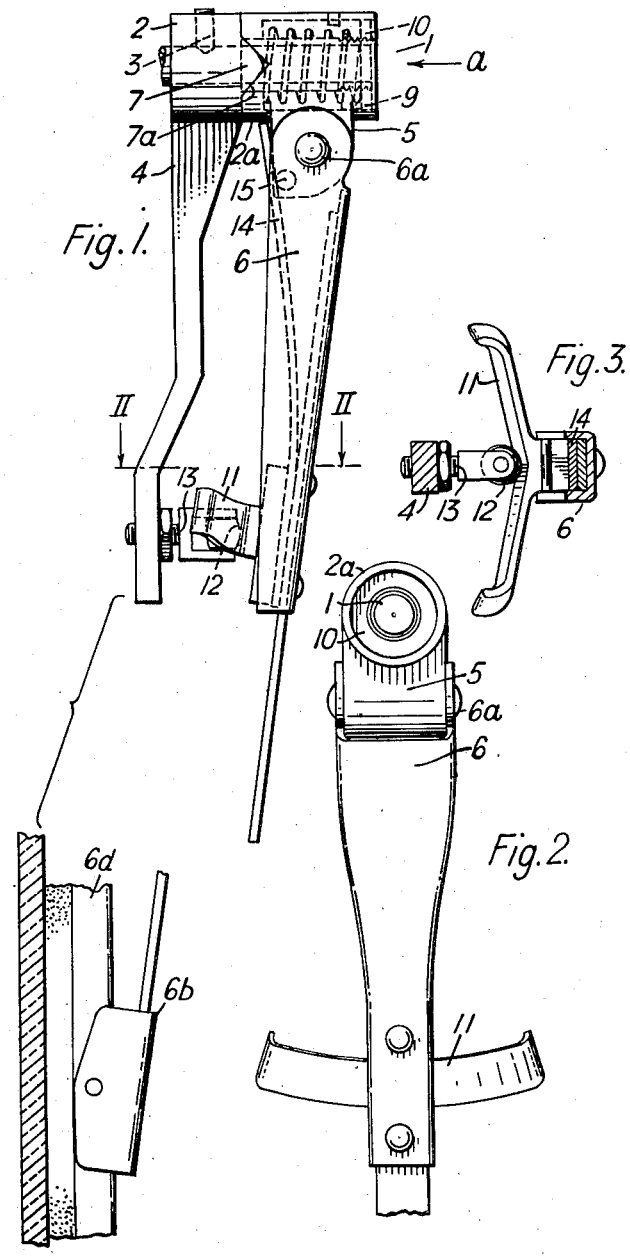

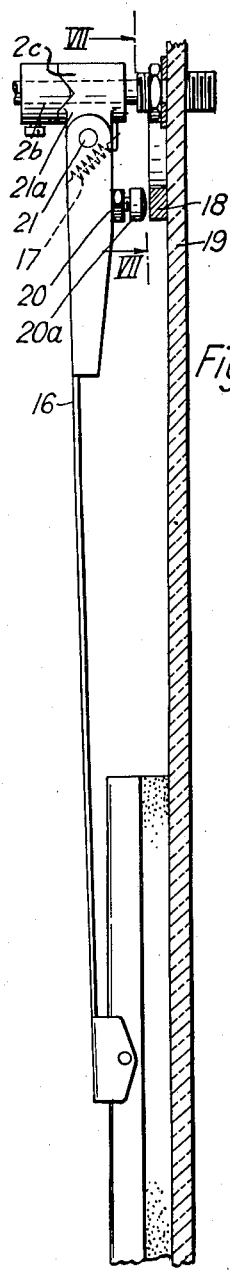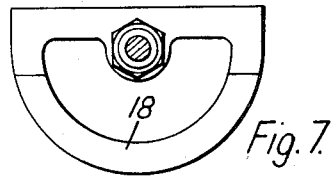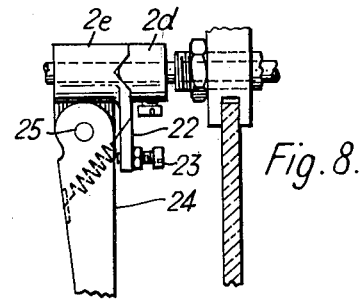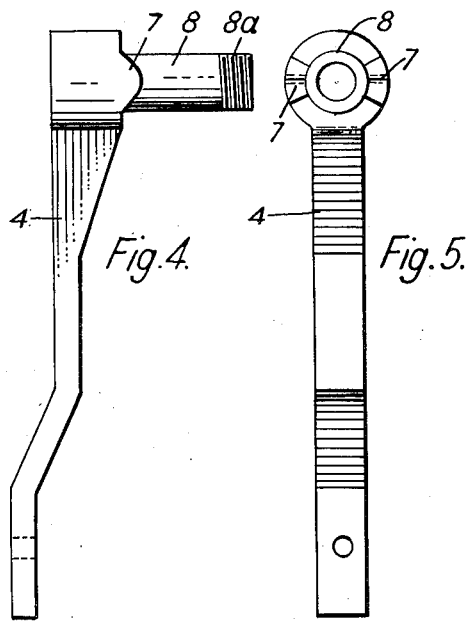

This invention relates to windscreen wipers of the type in which a wiper blade is mounted on an operating or wiper arm and the wiper blade is spring pressed on the windscreen and is operated to sweep the blade over the screen. In certain circumstances such as on drying or dry screens the frictional resistance to movement of the wiper blade over the screen is greater than can be overcome by an electric motor driving the operating arm and this invention has for its object to automatically reduce the pressure of the wiper blade on the screen when the frictional resistance to movement is increased beyond a predetermined amount.

According to the present invention, a windscreen wiper comprises a wiper arm which is spring pressed on the windscreen, an oscillating spindle for oscillating the wiper blade over the windscreen, a component driven coupling member movably mounted on said spindle and on which said wiper arm is mounted, a driving component coupling member fixed on said spindle to oscillate therewith and spring controlled means for transmitting oscillatory movement from said driving coupling member to said driven coupling member under normal resistance to movement of the wiper blade over the windscreen but allows relative movement of the coupling member when resistance exceeds the normal, and means for relieving the pressure on the wiper blade on the windscreen operated by relative movement of said coupling members. The windscreen wiper may comprise a wiper arm carrying a wiper blade, an oscillating spindle for oscillating the wiper blade over the windscreen, a first component coupling member slidably and rotatably mounted on said spindle on which coupling member said wiper arm is mounted, a said second component coupling member fixed to oscillate with said spindle, engaging means on said coupling members whereby the second coupling member drives the coupling member with a force urging the first coupling member axially on said spindle to effect a pressure release of the wiper blade on the windscreen and spring means for holding the coupling members in engagement under normal resistance to movement of the wiper blade on the windscreen.

Referring to the drawings:

FIGURE 1 is a side elevation of a windscreen wiper constructed according to this invention.

FIGURE 2 is a front elevation looking in the direction of arrow *a* of FIGURE 1.

FIGURE 3 is a section on line II—II of FIGURE 1.

FIGURE 4 is a side elevation of one member of the coupling driving the wiper arm.

FIGURE 5 is an end view of FIGURE 4.

FIGURE 6 is a side elevation of a further construction of the invention.

FIGURE 7 is a face view of a cam plate on line VII—VII of FIGURE 6, and

FIGURE 8 is a side elevation of a further form of the invention.

According to a convenient embodiment of this invention as shown by FIGURES 1 to 5 and suitable for commercial vehicles, a dog clutch or coupling is mounted on a driving spindle 1 which is oscillated in the usual manner by power from an electric motor or other source of power, and one component coupling member 2 of the clutch comprises a sleeve which is fixed by set pins 3 on the driving spindle 1 and has an abutment member or arm 4 thereon. The other component coupling member 2*a* of the coupling or clutch has a lug 5 thereon on which an operating or wiper arm 6 is pivotally mounted on the pin 6*a* about an axis at right angles to the axis of the driving spindle 1. The operating or wiper arm 6 is spring urged towards the windscreen and a wiper blade is pivoted at its centre on the fitting 6*b* in the usual manner. The component coupling members 2 and 2*a* of the clutch or coupling have respectively, on diametrically opposite sides, dog teeth 7 with inclined sides and recesses 7*a* with inclined sides engaged by the teeth 7 and the component member 2*a* carrying the wiper arm 6 is spring pressed into engagement with the component coupling member 2 fixed on the driving spindle. The spring pressure may be adjustable so that the device will operate at a predetermined frictional resistance to movement of the wiper. The component coupling member 2*a* is in the form of a sleeve which is rotatably mounted on the stem 8 of the component coupling member 2 and the recesses 7*a* are on diametrically opposite sides of the sleeve. The sleeve is counterbored to receive a helical spring 9 which is adjustably compressed by the nut 10 which engages screw thread 8*a* on the stem 8. The spring 9 holds the dog teeth 7 in full engagement with the recesses 7*a* and resists relative rotation of the component coupling parts 2 and 2*a* of the coupling under normal resistance to movement given by the wiper blade moving over the windscreen. Should there be too much resistance to movement of the wiper blade on the windscreen, the component parts of the coupling or clutch will separate by the inclined or helical faces of the dog teeth sliding on inclined or helical faces of the triangular recesses, and at the same time the abutment member or arm 4 will have an angular movement in relation to the operating arm 6.

The wiper arm 6 is spring urged to press the wiper blade on the windscreen and is pivoted on the axially movable component member of the coupling and the axial movement alone of such component member would not relieve the pressure on the screen of the wiper blade 6*d* and therefore on movement of said component member, the spring pressure on the wiper arm is transferred to the abutment member 4 and the wiper arm co-acts with this abutment member to ensure that the wiper arm moves away from the screen with the axial movement of the coupling member 2*a*. The wiper arm 6 is spring pressed towards the windscreen by means of a blade spring in known manner. The blade spring 14 presses on a cross pin 15 on the lug 5 and thus spring urges the wiper arm towards the screen. For this purpose, in this embodiment, a V-shaped cross arm 11 is mounted on the wiper arm 6 and a roller 12 on a projection, mounted on the abutment arm 4, is normally located at the centre of the V-groove formed by the cross arm, so that when relative rotary movement of the coupling members 2 and 2*a* in either direction takes place, the wiper arm is moved away from the screen and the pressure of the wiper blade on the screen is relieved. The normal setting is such that the roller 12 is out of contact with the cross arm 11 when the wiper is in normal action, the wiper blade 6*d* bearing on the screen holding the parts in such position. The roller 12 is mounted on the head of a screw pin 13 to set the roller in this position. The roller 12 may be replaced by a headed nylon stud or other adjustable projection. The arm 4 of FIGURE 1 may be pivotally mounted on the coupling member 2 and spring urged to travel over a cam plate (such as 18 of FIGURE 6) fixed in relation to the windscreen.

In a further form of the invention and suitable for private vehicles, as shown by FIGURE 6, the coupling comprises component members 2*b* and 2*c*, corresponding to the component parts 2 and 2*a* of the previously described embodiment. The wiper arm 16 is rigid and conveniently U-shaped in cross-section and is spring urged towards the windscreen by a spring 17 connected to the wiper arm and a projection or lug 21a on which the wiper arm 16 is pivoted. A cam or abutment plate 18 is fixed in relation to the windscreen 19 and an adjustable projection in the form of a headed screwed pin 20 is mounted on the wiper arm to oscillate over the cam plate. The head 20a of the screwed pin may be of nylon and is slightly distanced from the cam plate 18 when the wiper blade is pressed on the windscreen for normal working and free away from the cam plate 18. Should resistance to movement of the wiper blade be too great for the power oscillating the spindle on which the coupling is mounted the coupling part 2c will be moved axially towards the windscreen and the head 20a will first press on the cam plate 18 and the wiper arm will then be swung on its pivot 21 away from the windscreen. The cam plate is shaped to the curvature of the windscreen, because the wiper arm, carrying the wiper blade, will follow the shape of the screen, and as the cam plate follows the shape of the screen, the head 20a will be equally distanced therefrom in all positions, so that it will be ready for action at any positions of the wiper blade as it sweeps over the windscreen.

In a further form of the invention for passenger vehicles as shown by FIGURE 8, the coupling members 2d and 2e are similar to the coupling members previously described, but the moving coupling member 2e has a lug or abutment member 22 thereon which carries an adjustable abutment screw 23 for co-acting with the wiper arm 24 pivoted at 25 on a lug on the moving coupling component 2e. The screw 23 is distanced from the wiper arm 24 under normal conditions, but when the coupling member 2e is moved axially away from the windscreen, the screw 23 contacts the wiper arm 24 and the wiper arm is moved away from the screen, as when the screw 23 abuts on the wiper arm 24, the wiper arm cannot pivot at 25 towards the windscreen. The construction is suitable for windscreens which are flat.

In a construction in which the wiper arm is not pivotally mounted on the movable coupling member, such wiper arm will be moved away from the windscreen by the movement of the movable coupling member, such as 2e of FIGURE 8.

Having thus described the invention, what is claimed as new and desired to be secured by Letters Patent is:

1. A windscreen wiper including a wiper arm, a wiper blade carried on said wiper arm, spring means for pressing the wiper blade onto the windscreen, an oscillatable spindle for oscillating the wiper blade carried by the wiper arm over the windscreen, a first component coupling member movably mounted on said spindle and having the wiper arm mounted thereon, a second component coupling member fixed on said spindle so as to oscillate therewith, spring loaded means for transmitting oscillatory movement from said second coupling member to said first coupling member, an abutment member positioned in relation to the wiper arm and engageable thereby in response to movement of said first coupling member away from said second coupling member, said spring loaded means retaining said coupling members in driving engagement and permitting overload movement of said first coupling member away from said second coupling member in response to increased friction between the wiper blade and the windscreen, said overload movement of the first coupling member causing said wiper arm to bear on said abutment member and thus relieve the pressure of the wiper blade on the windscreen whilst said coupling members remain in driving engagement.

2. A windscreen wiper including a wiper arm, a wiper blade carried on said wiper arm, spring means for pressing the wiper blade onto the windscreen, an oscillatable spindle for oscillating the wiper blade carried by the wiper arm over the windscreen, a first component coupling member movably mounted on said spindle and having the wiper arm mounted thereon, a second component coupling member fixed on said spindle so as to oscillate therewith, interengaging driving faces on said first coupling member and on said second coupling member, said faces tending to effect relative axial displacement of said first coupling member away from said second coupling member when a driving torque is applied, spring means for urging said driving faces into engagement but permitting axial displacement of said first coupling member in response to increased friction between the wiper blade and the windscreen with said faces remaining in driving engagement, an abutment member positioned in relation to the wiper arm and engageable thereby in response to said axial displacement of said first coupling member, engagement of said wiper arm on said abutment member relieving the pressure of the wiper blade on the windscreen.

3. A windscreen wiper including a wiper arm, a wiper blade carried on said wiper arm, spring means for pressing the wiper blade onto the windscreen, an oscillatable spindle for oscillating the wiper blade carried by the wiper arm over the windscreen, a first component coupling member movably mounted on said spindle and having the wiper arm mounted thereon, a second component coupling member fixed on said spindle so as to oscillate therewith, interengaging driving faces on said first coupling member and on said second coupling member said faces tending to effect relative axial displacement of said first coupling member away from said second coupling member when a driving torque is applied, spring means for urging said driving faces into engagement but permitting axial displacement of said first coupling member in response to increased friction between the wiper blade and the windscreen with said faces remaining in driving engagement, an arm extending radially from the second coupling member and adapted to depend downwardly therefrom when the wiper is in position, an abutment member carried on the lower end of said arm and projecting towards the wiper arm, and a cross arm mounted on the wiper arm and adapted, in response to said axial displacement of the first coupling member, to engage said abutment at any point during the normal oscillatory travel of the wiper arm.

4. A windscreen wiper including a wiper arm, a wiper blade carried on said wiper arm, spring means for pressing the wiper blade onto the windscreen, an oscillatable spindle for oscillating the wiper blade carried by the wiper arm over the windscreen, a first component coupling member slidably and rotatably mounted on said spindle, a lug extending radially from said first component coupling member and having the wiper arm pivotally connected thereto, a second component coupling member fixed on said spindle so as to oscillate therewith, interengaging driving faces on said first coupling member and on said second coupling member said faces tending to effect relative axial displacement of said first coupling member away from said second coupling member when a driving torque is applied, a spring means for urging said driving faces into engagement but permitting axial displacement of said first coupling member in response to increased friction between the wiper blade and the windscreen with said faces remaining in driving engagement, an abutment member carried by said first coupling member and disposed in alignment with said wiper arm, the engagement of the wiper blade with the windscreen under normal operating conditions retaining the wiper arm spaced away from the abutment, axial displacement of the first coupling member away from the second coupling member causing engagement of the wiper arm with said abutment.

5. A windscreen wiper including a wiper arm, a wiper blade carried on said wiper arm, spring means for pressing the wiper blade onto the windscreen, an oscillatable spindle for oscillating the wiper blade carried by the wiper arm over the windscreen, a first component coupling member slidably and rotatably mounted on said spindle and having the spring pressed wiper arm pivotally connected thereto, a second component coupling member fixed on said spindle so as to oscillate therewith, interengaging driving faces on said first coupling member and on said second coupling member, said faces tending to effect relative axial displacement of said first coupling member away from said second coupling member when a driving torque is applied, spring means for urging said driving faces into engagement but permitting axial displacement of said first coupling member in response to increased friction between the wiper blade and the windscreen with said faces remaining in driving engagement, a projection mounted on said wiper arm and directed toward the windscreen, an abutment positioned on the windscreen and extending over and registering with the whole arc of movement of said projection, the engagement of the wiper blade with the windscreen under normal operating conditions retaining the projection spaced away from the abutment, axial displacement of the first coupling member causing engagement of the projection with said abutment.

References Cited in the file of this patent
FOREIGN PATENTS 743,720    Great Britain _____ Jan. 25, 1956